US007358630B2

(12) United States Patent
Vasilescu et al.

(10) Patent No.: US 7,358,630 B2

(45) Date of Patent: Apr. 15, 2008

(54) VENTILATING DEVICE FOR ROTARY ELECTRICAL MACHINE

(75) Inventors: Claudiu Vasilescu, Paris (FR); Richard Tellier, Paris (FR); Nam-Gook Kim, Saint-Maurice (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 143 days.

(21) Appl. No.: 10/555,646

(22) PCT Filed: May 14, 2004

(86) PCT No.: PCT/FR2004/001180

§ 371 (c)(1),
(2), (4) Date: Nov. 4, 2005

(87) PCT Pub. No.: WO2004/106748

PCT Pub. Date: Dec. 9, 2004

(65) Prior Publication Data

US 2007/0041843 A1 Feb. 22, 2007

(30) Foreign Application Priority Data

May 26, 2003 (FR) .................................. 03 06348

(51) Int. Cl.
*H02K 9/00* (2006.01)

(52) U.S. Cl. .......................................... 310/62; 310/58

(58) Field of Classification Search .................. 310/52, 310/54, 58, 64, 62
See application file for complete search history.

(56) References Cited

U.S. PATENT DOCUMENTS

| | | | | |
|---|---|---|---|---|
| 1,827,316 A | | 10/1931 | Haynsworth | |
| 2,962,207 A | * | 11/1960 | Mayne | 416/187 |
| 4,174,559 A | | 11/1979 | Persik et al. | |

FOREIGN PATENT DOCUMENTS

| | | |
|---|---|---|
| FR | 2 602 925 A | 2/1988 |
| FR | 2 741 912 A | 6/1997 |

* cited by examiner

*Primary Examiner*—Dang Le
*Assistant Examiner*—Nguyen Hanh
(74) *Attorney, Agent, or Firm*—Berenato, White & Stavish

(57) ABSTRACT

The ventilating device fixed on a rotor of a rotary electrical machine, comprises a first fan (62*a*) having a radial plate portion (64*a*), at least one second fan (62*b*) having a radial plate portion (64*b*), and means for fastening the two fans (62*a*, 62*b*), each fan (62*a*, 62*b*) having, at the outer peripheiy of its radial plate portion, first branches (78*a*) and second branches (78*b*) which extend radially outwards, at least some of the branches having a blade (68*a*, 68*b*), while at least one first branch (78*a*) and at least one second branch (78*b*) includes a first (78*a*) and a second (78*b*) mutual overlapping portion to define an overlap zone (Z), the said fastening means (80, 82) being at least partly arranged at the level of the overlap zone.

13 Claims, 6 Drawing Sheets

VENTILATING DEVICE FOR ROTARY ELECTRICAL MACHINE

FIELD OF THE INVENTION

The present invention relates to a ventilating device for a rotary electrical machine, especially for a motor vehicle.

Such a machine may be an alternator or an alternator-starter for a motor vehicle, or some other type of rotary electrical machine, and is described for example in the documents FR-A-2 602 925 and JP-A-6 121 497, to the contents of which reference may be made for more details.

This machine includes a hollow support for fastening the machine on a fixed part, a stator, and a rotor which carries at least one ventilating device.

The stator surrounds the rotor, which is fixed on a rotor shaft.

The support carries the stator at its outer periphery, and has bearings arranged centrally, such as rolling bearings with one or two rows of balls, for mounting the rotor shaft in rotation in such a way that the rotor and stator are mounted within the support, the latter including two parts which are called the front bearing plate and rear bearing plate.

CURRENT STATE OF THE ART

In this type of machine, the rotor and/or the stator comprise at least one winding such that, in operation, the machine becomes heated. Mechanical friction also occurs in operation. This friction contributes to the heating of the machine.

In some applications, especially where the machine is an alternator or an alternator-starter for a motor vehicle, the machine carries electronic components which it is necessary to protect against any excessive heating, so as to prevent them being destroyed.

For all these reasons it is necessary to cool the rotary electrical machine.

In order to make the machine compact, and to cool it by flow of a coolant fluid which is generally air, it is arranged that a fan be fixed on at least one of the axial ends of the rotor, and the support is formed with openings, or ports, for inlet of air and exit of air as disclosed in the documents FR-A-2 602 925 and JP-A-6 121 497 mentioned above.

The fan comprises a central radial plate portion, from which a set of projecting fan blades extends radially outwards and in axial projection.

In order to reduce noise from the rotary electrical machine while improving its ventilation, it was proposed in the document FR-A-2 811 156 to give the fan a second set of blades.

With that arrangement, the dangers of detachment of the stream of coolant fluid from the blades of the first set of blades are reduced. The flow of the coolant fluid is more laminar, and it takes place therefore with little friction and little noise.

Back flows of fluid are prevented.

That type of ventilating device does give satisfaction, but in some cases it can be difficult to obtain a large number of blades of the desired form.

It has therefore been proposed that a solution be adopted with superimposed fans, such as that described in the document FR-A-2 741 912. In that document there was proposed a ventilating device adapted to be fixed on a transverse end face of an axial end of a rotor of a rotary electrical machine, of the type comprising:

a first fan comprising a transversely oriented central plate portion, from which first blades extend radially outwards;

at least one second fan comprising a second transversely oriented central plate portion, from which second blades extend radially outwards;

and of the type comprising means for fastening the two fans.

In that device, a blade of the other fan is interposed at least between two consecutive blades of one of the fans, and each of the blades is joined to a peripheral branch of each radial plate portion formed at its outer periphery. The blades are therefore carried by the branches.

The central radial plate portions are superimposed on each other and are adjacent to each other, and their fastening means consist of one or more sets of fastening points which are spot-welding points and which are for example arranged on a pitch circle, the fastening points being spaced apart on the surface of the two superimposed radial plate portions, the form of which is generally annular.

In this way, a ventilating device, or fan sub-assembly, is obtained which can then be fixed on the axial end face of the rotor.

This fastening is for example obtained by means of a set of fastening points, such as welding points, for fastening one of the radial plate portions to the rotor.

OBJECT OF THE INVENTION

Having regard to the presence of the mutual fastening points of the two radial plate portions, little space is left over for the provision of the fastening means by which the device is fastened on the rotor, if sufficient mechanical strength is to be ensured in the fastening on the rotor.

In order to overcome this drawback, the invention proposes a device of the type set forth earlier herein, wherein each fan has, extending radially outwards from its outer periphery, first branches and second branches respectively, and wherein at least some of the said branches carry a blade, characterised in that at least one first branch and at least one second branch include a first mutual overlapping portion and a second mutual overlapping portion, to define an overlap zone, and in that the said fastening means of the two fans are arranged at least partly in the region of the said overlap zone.

Thus, the branches are configured in such a way that they have overlapping zones which, in combination with the fastening points, enable the ventilating device to be stiffened while at the same time leaving enough space in the region of the annular central part of the radial plate portions for fastening on the rotor.

In one embodiment, at least one of the said branches carries a blade, which makes it possible to have the desired number and/or size of blades.

In another embodiment, each branch carries a blade.

It is thus possible to reduce or even eliminate the fastening points by which the two fans are fixed together, and which are interposed between the central annular parts of the said radial plate portions, and it is therefore possible to create openings in the free zones of the radial plate portions for fastening of the sub-assembly on the rotor, which is done in known ways such as welding or riveting.

In addition, it is possible to reduce the thickness of each of the radial plate portions and/or to stiffen them with ribs or equivalent means, while having enough space free for fastening the sub-assembly on the rotor.

Moreover, it is easily possible to achieve dynamic balancing beforehand, that is to say pre-balancing, of the fans by adding material to, or removing it from, the fans in the vicinity of at least one of the fastening points of the branches and/or in the region of the blades. Balancing means are therefore located in the vicinity of the means by which the branches of the fans are fixed together.

It will also be appreciated that it is possible to stop up at least partly the space between two teeth of a pole wheel of a claw-type rotor, in order to reduce noise in operation.

It will be appreciated that, thanks to the invention, one of the fans may be made in a plurality of parts, and that one of the fans can include a metallic insert and blades with branches of plastics material which are stiffened by the overlapping zones and fastening points.

The fastening means of the two fans include, for example, at least one fastening point for fastening the overlapping portions of the two branches together.

Preferably, the said balancing means are located in the vicinity of this fastening point.

The fastening point is arranged for fastening by welding or adhesive bonding.

The fastening point is adapted for fastening by riveting, in particular by extrusion in order to reduce the number of components.

The fastening point is adapted for fastening by crimping.

Preferably, the said fastening means comprise two fastening points for fastening the overlapping portions of the two branches together, which are, in particular, arranged in the vicinity of opposed ends of the two overlapping portions, so as to give the ventilating device the greatest possible stiffness.

Thanks to this arrangement, the fastening points enable the presence of stiffening ribs for the blades and branches of one of the fans, or even for both fans, to be eliminated.

The two fastening points are offset circumferentially and radially from each other, in order to obtain robust fastening of the fans.

The said first and second mutual overlapping portions of the branches are flat portions which lie in parallel transverse planes.

Each of the said transverse, flat, mutual overlapping portions of the branches lies in the same plane as the central plate portion from which the corresponding branch extends.

At least one blade of one of the fans is interposed circumferentially between at least two consecutive blades of the other fan.

Each of the blades of one of the fans, at least, is carried by a branch which has an overlapping portion for overlapping with an overlapping portion of a branch that carries a blade of the other fan, and the said fastening means fastening the two fans together are disposed at least partly in the region of all of the said overlapping portions of the branches.

A circumferential indexing mechanism is interposed between the first and second radial plate portions, for circumferentially positioning the first blades with respect to the second blades.

Each radial plate portion has a central hole and includes, in its inner radial edge, a notch for providing the said relative angular positioning of blades by putting the notches into coincidence with each other.

In a modified version, one of the fans includes a projecting element which penetrates into a complementary recess or aperture in the other fan, in such a way as to constitute means for circumferentially indexing by complementary mating cooperation.

The first and second radial plate portions are superimposed on each other.

The first and second radial plate portions are either in direct contact or in indirect contact with a thermal insulation mechanism being interposed, such as a thermally insulating coating or layer.

In order to obtain the advantage of noise reduction, one of the fans, which is preferably the one furthest away from the rotor, is mounted on the rotor under prestress.

All combinations are possible.

BRIEF DESCRIPTION OF THE DRAWINGS

The invention will be understood more clearly, and further objects, features, details and advantages of it will appear more clearly on a reading of the following description which is made with reference to the attached diagrammatic drawings, which are given by way of example only and in which.

DESCRIPTION OF PREFERRED EMBODIMENTS OF THE INVENTION

Figure 1:
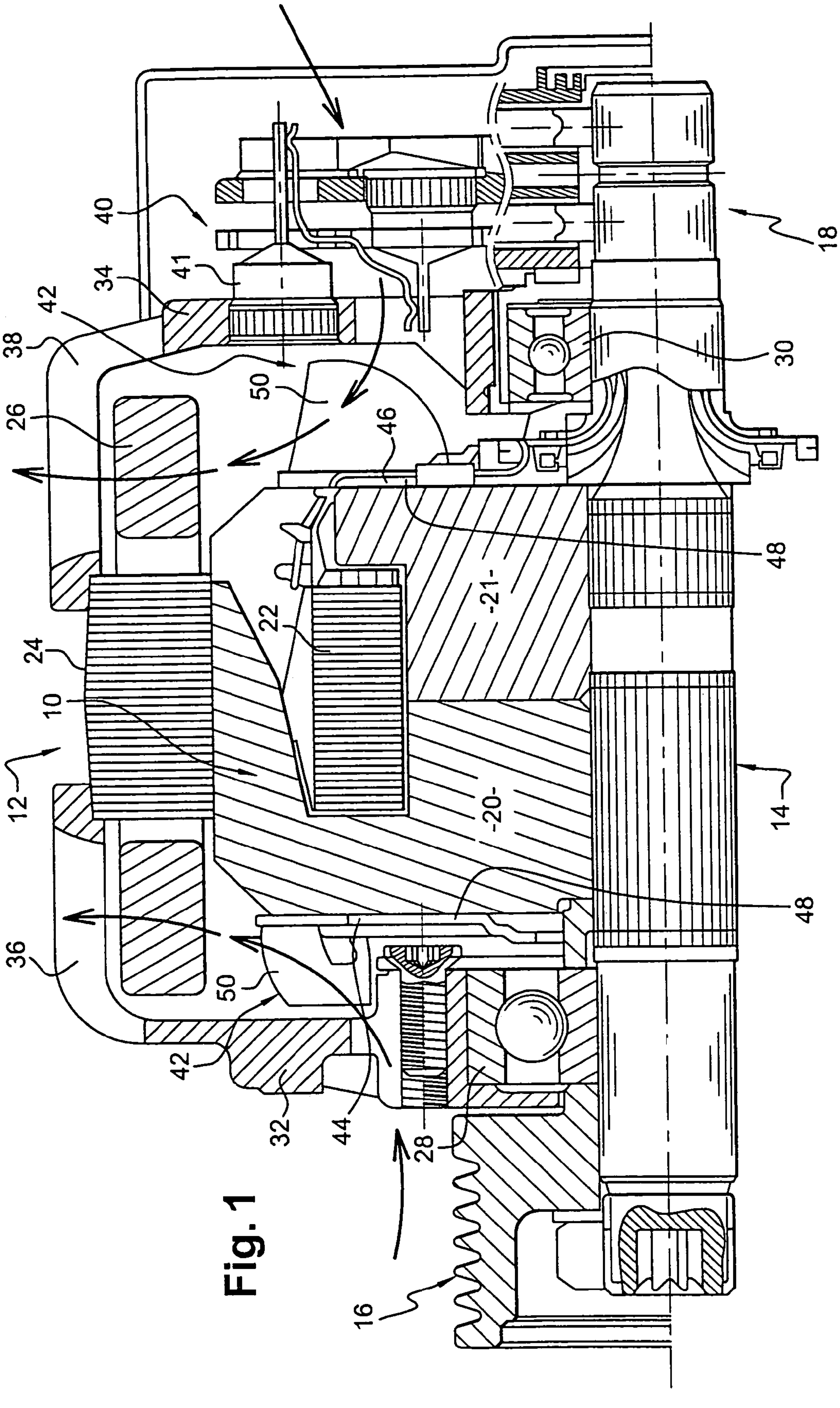
FIG. 1 is a view of a standard alternator in axial cross section.

The sole purpose of FIG. 1 is to recall briefly the general structure of a polyphase alternator with internal ventilation, for a heat engine of a motor vehicle, with a view to putting the invention in its preferred context of use.

For the understanding of the invention, it is sufficient to indicate that the alternator shown comprises essentially a rotor 10 surrounded by a stator 12 and mounted rotatably on a rotor shaft 14, the front end of which carries a drive pulley 16 for rotation with it, while the rear end carries slip rings (not given reference numerals) which are part of a collector 18. The pulley 16 is arranged to be coupled to the heat engine of the vehicle through a belt transmission.

In this example, the rotor 10 is of the claw type, and comprises two pole wheels designated by the references 20 and 21, which have axially oriented teeth offset circumferentially as between one wheel and the other. The reference 22 designates the excitation winding of the rotor mounted between the front pole wheel 20 and rear pole wheel 21.

The stator comprises a body 24 which is formed with internal slots for containing wires or hairpins of the windings 26 of the stator. The windings 26 extend through the body 24, which consists of a bundle of steel laminations stacked axially and projecting axially on either side of the body 24, so as to constitute a front chignon and a rear chignon (which are not given reference numerals).

The number of windings 26 depends on the application, and in particular on the number of phases of the alternator.

The rotor shaft 14 is supported by a front ball bearing 28 and a rear ball bearing 30, these ball bearings being mounted in bearing plates at the axial ends, namely a front bearing plate 32 and rear bearing plate 34, in which ports 36 and 38 are formed for flow of the air.

The bearing plates 32 and 34 are hollow, and are configured in such a way that they carry at their outer periphery the body 24 of the stator 12. Stretchers or screws, shown in the above mentioned document FR-A-2 602 925, join the bearing plates 32 and 34 together to constitute a hollow support or casing which is arranged to be fixed on a fixed part of the vehicle.

The reference 40 designates the conventional rectifying device, with diodes 41, for rectifying the alternating current produced by the machine. This device is connected to the outputs of the windings 26 of the stator, and in this example it is carried by the rear bearing plate 34, which also carries a voltage regulator (not visible in FIG. 1) and a brush carrier (part of which is shown in FIG. 1).

The brushes (not given reference numerals), which are mounted for sliding movement in the brush carriers, are arranged to cooperate with the slip rings of the collector 18, which are connected through connecting wires to the ends of the excitation winding 22, while the brushes are connected to the voltage regulator which, in a manner known per se, thereby governs the excitation winding.

The alternator includes front and rear ventilating devices 42, which are fixed, respectively, on a transverse front face of the front pole wheel 20 and on a rear transverse face 46 of the rear pole wheel 21, for rotation therewith.

These faces 44 and 46 constitute the axial ends of the rotor 10.

Each ventilating device, or fan, 42 comprises a central annular plate portion 48 which is applied and fixed on the end face 44 or 46 of the supporting pole wheel, and, at its outer periphery, a plurality of blades 50 which project axially from the plate portion 48.

The two ventilating devices, or fans, 42, which therefore lie next to the front bearing plate 32 and rear bearing plate 34, are provided for the purpose of setting up a flow of a cooling fluid, in this case air, for cooling the hottest working parts of the alternator, such as the diodes 41 of the rectifying device 40, the bearings 28 and 30, the winding of the rotor 10, and the windings 26 of the stator, driving the air through various appropriate apertures formed in the bearing plates in the manner indicated by the arrows.

More precisely, each bearing plate 32, 34 has, in the vicinity of the associated rolling bearing 28, 30, central air inlet apertures in facing relationship with a portion of the blades 50, together with outlet apertures in facing relationship with the corresponding chignon of the windings 26.

The ventilating devices, or fans, 42 are fitted below the chignons of the windings, given that the rear ventilating device or fan is preferably more powerful than the front ventilating device, or fan, because it also has to cool the rectifying device 40 and the voltage regulator.

It is evident that, the more the electrical power output of the alternator increases, the more must the cooling capacity of the ventilating devices be increased. This increase in the electrical output of the rotary machine is sought without increasing the volumetric size of the vehicle. This objective is achieved by an appropriate configuration of the blades 50.

Figure 2:
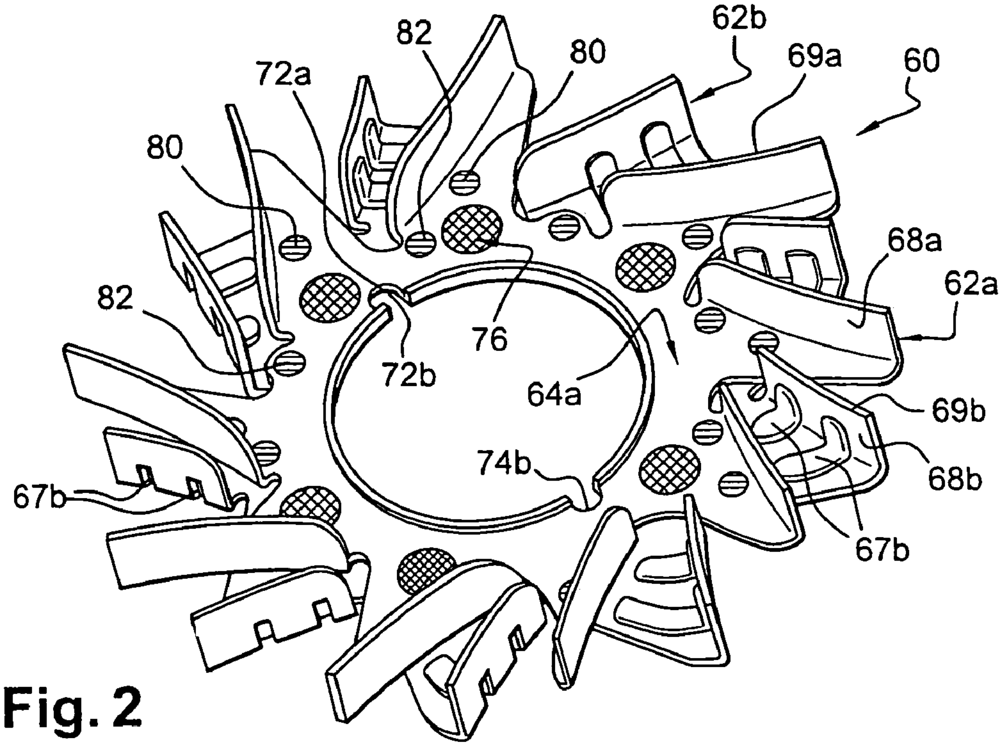
FIG. 2 is a perspective view, seen from the rear, of one example of the application of the principles of the invention in the manufacture of a rear ventilating device of the kind seen in FIG. 1.

FIG. 2 shows a rear ventilating device according to the invention which is designed for this purpose. It carries the general reference numeral 60, and in the embodiment described, it is fitted in place of the rear fan 42 of FIG. 1, the front of the device 60 being in direct or indirect contact with the rear transverse face 46 of the pole wheel 21.

The ventilating device 60 in this example consists of two adjacent fans **62*a*, 62*b***, which are referred to hereinafter as the first fan and second fan respectively.

The second fan **62*b* is adapted to be fixed, for example by a known spot welding or riveting method, on the front face 46 of the appropriate axial end of the rear pole wheel 21 of the rotor shown in FIG. 1**.

The second fan **62*b* is in contact with the associated pole wheel. This contact is direct or indirect contact, there being a mechanism which is hereinafter called a third thermal insulation mechanism, and which may be a coating or layer of an electrically insulating material, interposed at least locally between the pole wheel 21 concerned and the second fan 62*b***.

In this example, the fans **62*a* and 62*b* are metallic, and are made inexpensively from steel plate. Each fan 62*a* or 62*b* has a central part in the form of the annular plate portion 64*a*, 64*b* which is substantially flat, annular, and oriented transversely, the plate portion being formed with a circular central aperture 66*a* or 66*b* for the passage through it of the rotor shaft 14 shown in FIG. 1, while at its outer periphery, and projecting outwardly, the plate portion has a set of fan blades 68*a*, 68*b* which project axially with respect to the plate portion 64*a*, 64*b***. Outwardly divergent ventilating channels are thereby formed on each fan.

These channels are bounded by two consecutive blades. More precisely, the fan blades **68*a* and 68*b* of each ventilator 62*a* or 62*b* are spaced apart circumferentially in such a way that, between two consecutive blades 68*a* or 68*b* of one of the fans 62*a* or 62*b*, at least one blade 68*b* or 68*a* of the other fan 62*b* or 62*a*** is located.

In one embodiment, the blades are spaced apart circumferentially at regular intervals.

Figure 3:
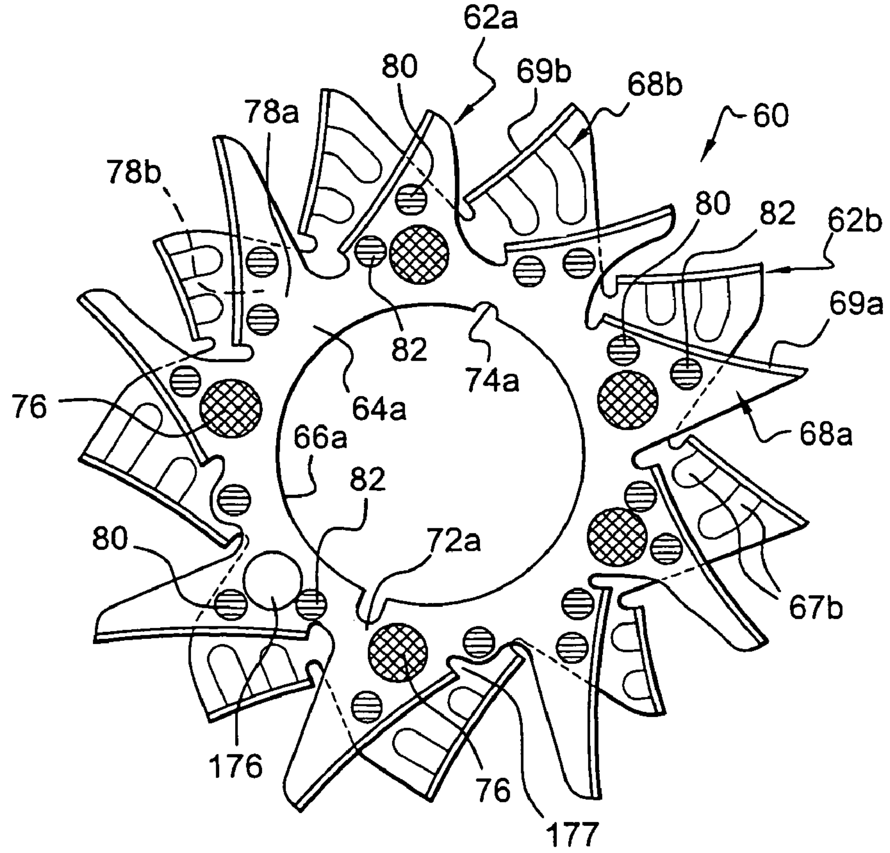
FIG. 3 is an axial end view, seen from behind, of the ventilating device in FIG. 2.

In a modified version and as can be seen in FIG. 3, with a view to reducing noise the first and second blades are not spaced apart circumferentially at regular intervals, the circumferential gaps between two consecutive blades **68*a*, 68*b*** not being regular.

In another modified version, at least two consecutive blades of one of the fans does not have any blade of the other fan interposed between them, so that there is no regular distribution and noise is reduced.

It will be noted in FIG. 3 that some of the blades **68*b* have a length which is different from the other blades 68*b***, again with a view to noise reduction.

The blades **68*a* and 68*b* in this example are made by press-forming and bending out from the corresponding metallic plate portion 64*a* or 64*b*, and they are of curved form as can be seen in FIG. 2, the ventilating device 60 being of the centrifugal type in this example. The blades 68*a* and 68*b*** are therefore of the same type here.

The blades **68*a* and 68*b*** have a substantial radial length, and can therefore provide very good ventilation. In this example, the radial length of the blades is greater than their axial height.

The second blades **68*b* are reinforced by pairs of parallel ribs 68*b* which, by virtue of the invention, are able to be extended in length at the level of the branches 78***b* of the fan 62*b*, by long ribs due to the fact that the second fan is formed, as will be described later herein, with branches 78*b* having second overlapping portions.

Without departing from the scope of the invention, in a modified version (not shown) the blades are flat and oriented radially, the fan being a centrifugal fan. In a modification, the blades are inclined with respect to an axial and/or radial direction. In a further modified version, the axial height of the blades is greater than their radial length.

In yet another modified version, the blades may be inclined and curved with respect to the plane of the associated radial plate portion, as described in the above mentioned document FR-A-2 602 925. In a further modified version, the blades of the fan are helical, the fan being of the helical centrifugal type. In a further modified version, at least some of the blades are at right angles to the plane of the radial plate portion and are oriented in a non-radial direction. All combinations are possible, with the blades of each of the fans being able to be of a centrifugal, or helical centrifugal, or axial, type.

The distribution of the blades is determined according to the electrical machine which is to be cooled, in order to obtain the best possible cooling with a minimum of aerodynamic noise.

An angular (or circumferential) indexing mechanism is interposed between the two radial plate portions 64*a* and 64*b*, in order to give good angular positioning and therefore good orientation of the blades 68*a* and 68*b*.

To this end, each radial plate portion 64*a*, 64*b* has, in the edge of its circular central aperture 66*a*, 66*b*, a pair of notches 72*a*, 72*b* and 74*a*, 74*b*. The notches 72*a*, 72*b* and 74*a*, 74*b* have a base portion of identical form, namely a base portion with a semi-circular profile. It will be noted that the notches 72*a* and 72*b* are deeper than the notches 74*a* and 74*b*, so that this enables the two fans to be indexed circumferentially with respect to each other.

It is therefore necessary only to superimpose the notches on each other, for example with the aid of a drift, in order to obtain a good angular position. The fans are then fixed together, for example by adhesive bonding, or by welding, which is preferably spot welding, or by crimping or riveting, the rivets being preferably formed by extrusion from one of the radial plate portions, in a manner described later herein, thereby forming an assembly which is easy to handle and transport.

This assembly is then fixed on the rotor, for example by spot welding or laser welding, or by screw fastening or riveting, the rivets being preferably integral with the rotor.

It will be appreciated that the blades 68*a* and 68*b* in this example are all of substantially the same axial height, that is to say the free edges 69*a* and 69*b* of the blades are in the same transverse plane. More precisely, the blades 68*a* have an axial height which is slightly smaller than the blades 68*b*, the difference in height being equal to the thickness of the second radial plate portion 64*b*.

In a modified version which is not shown, the blades 68*a*, 68*b* have different axial heights. As a result, the free edges 69*a*, 69*b* of the blades are then all in the same plane.

The manufacture of the ventilating device 60 in two parts, or two fans, having complex blade configurations giving them enhanced cooling power, is obtained at a relatively low selling cost, while giving it good mechanical strength.

However, in order to benefit from these advantages, it is necessary to fix the two fans 62*a* and 62*b* together in a reliable way and as rigidly as possible, while having maximum availability in the central annular radial plate portions 64*a* and 64*b*, in accordance with the features of the invention, for the purpose, in particular, of providing and having available a very large number of rotor fastening points 76 for fastening the ventilating device 60 on the rotor. The rotor fastening points 76 define rotor fastening mechanism of the ventilating device 60.

Figure 4:
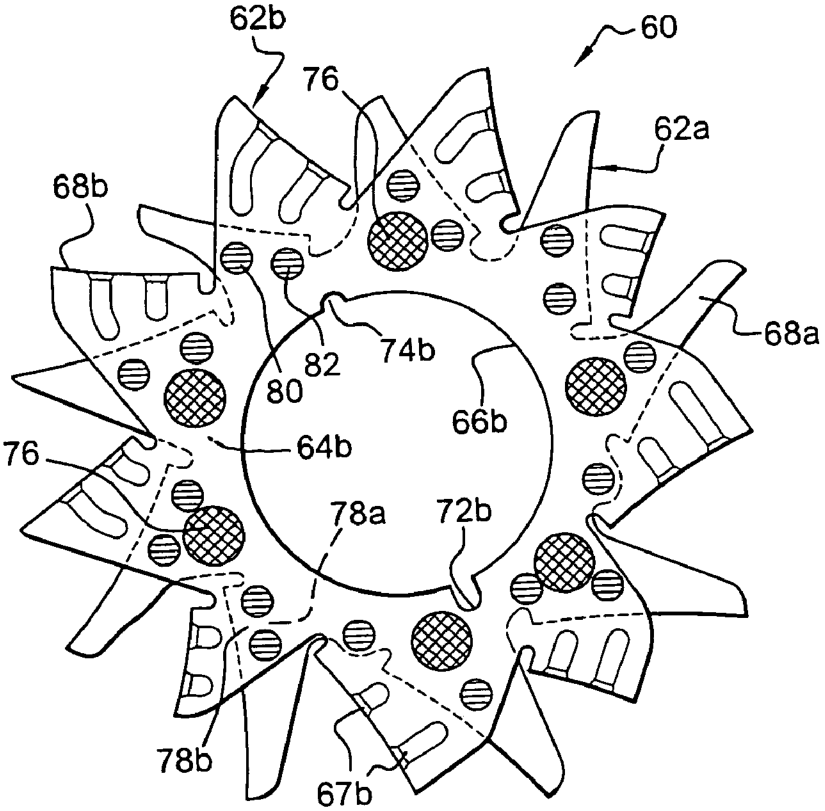
FIG. 4 is an axial end view, seen from the front, of the ventilating device in FIG. 2.

These rotor fastening points 76 have a large geometric extent thanks to the features of the invention described later herein, and in this example there are six of them. These points are indicated in FIGS. 2 to 4 by hatched circular zones.

To this end, the means for fastening the fans 62*a* and 62*b* together are interposed between at least a first branch 78*a* and a second branch 78*b* comprising a first and a second mutual covering, or overlapping, portion, so as to form an overlap zone Z.

More precisely, each radial plate portion 64*a*, 64*b* has, projecting radially outwards at its outer periphery, respective branches 78*a*, 78*b* which are referred to as the first branches 78*a* and second branches 78*b* respectively. Each branch 78*a* or 78*b* therefore extends transversely in the plane of the central annular plate portion 64*a* or 64*b*, and carries, in this embodiment, a first blade 68*a* and a second blade 68*b* respectively. Each of the blades is formed at the free end of a branch, and each is carried by one branch. In this embodiment the respective branches are press-formed, and the blades are formed by bending out the free ends of the branch concerned extending from the metallic radial plate portion of the corresponding fan. Each blade is therefore formed on a branch, being in this example integral with that branch.

The form of the branches depends on the applications.

Figure 3A:
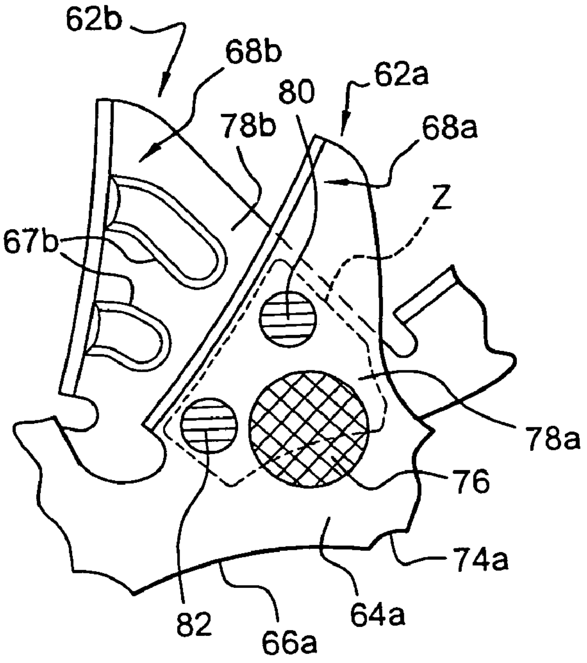
FIG. 3A is a scrap view on a larger scale, taken from FIG. 3.

The two branches 78*a* and 78*b* mentioned above are superimposed on each other, and overlie, or overlap, at least partly in an overlap zone Z which is indicated in broken lines in FIG. 3A, and it is thus possible to form in that zone associated fan fastening points 80 and 82, which in this example are in pairs. The fan fastening points 80 and 82 define a fan fastening mechanism of the ventilating device 60. These points 80, 82 have an extent smaller than that of the rotor fastening points 76. It will be noted that the ribs 67*b*, of which there are in this example two for each blade 68*b*, also extend into the branches 78*b* and extend up to the vicinity of a blade 68*a*.

For each pair of superimposed branches 78*a*, 78*b*, there is thus provided a point of mutual fastening 80 which is the furthest out radially, and another mutual fastening point 82 which is radially the furthest in.

Each blade 68*a* is joined to a first branch 78*a*, which is in overlapping relationship with a second branch 78*b* joined to the blade 68*b*, and each overlap zone Z includes two fastening points 80 and 82.

The fastening between the two fans 62*a* and 62*b* is thus particularly rigid, while enabling the large number of the rotor fastening points 76 to be provided for fastening the ventilating device 60 on the rotor. This way of fastening enables the formation of ribs on the blades 68*a* to be avoided.

The two fastening points in a pair of points 80, 82 in an overlap zone Z are spaced apart from each other by the maximum possible amount, being arranged at the limits of the said overlap zone in the branches 78*a*, 78*b*, so as to increase this general rigidity even more and also the rigidity of these branches, which form the roots of the blades, and the rigidity of the corresponding blades 68*a*, 68*b*.

It will be noted that in FIGS. 2 to 4, some pairs of the fastening points 80, 82, or in general terms a part of the fastening means, are located close to the points by which the fan is fastened on the rotor.

In this example, there are more of the fastening points arranged in pairs than there are points for fastening on the rotor, and this enables the second fan to be made in a plurality of parts fixed on the first fan.

The fastening points 80, 82 can be made in all known ways, suitably adapted.

They can for example be made by adhesive bonding or welding, in order to reduce costs.

Figure 12:
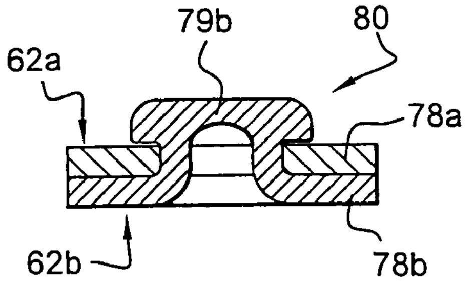

They can also consist of rivets, which are preferably formed by extrusion as can be seen at 79*b* in FIG. 12. In this FIG. 12, the two radial plate portions of the fans 62*a* and 62*b* are of metal, and the head of the rivet 79*b*, formed by extrusion from the radial plate portion of the fan 62*b*, is upset in contact with the overlapping portion of the branch 78*a* of the fan 62*a*, which has a hole for the rivet 79*b* to pass through.

Figure 11:
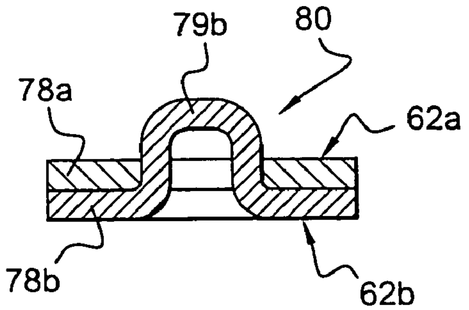

In another version shown in FIG. 11, the head of the rivet 79*b* is not upset and the assembly is formed by crimping, the hole in the overlapping portion of the branch 78*a* being so dimensioned as to enable the said portion 78*a* to be force-fitted on the rivet 79*b*.

Thanks to this method of fastening by riveting, one of the two fans may be made of plastics material. Thus, in another version in FIGS. 11 and 12, the first fan 62*a* is for example preferably made of plastics material, while the second fan 62*b* is of metal, for formation of a rivet 79*b* by extrusion. In this case, a first thermal insulation mechanism is preferably interposed, at least to a major extent, between the two radial plate portions of the fans. The first mechanism is preferably extended by a second thermal insulating mechanism interposed between the overlapping portions of the branches 78*a* and 78*b*.

In another modified version, the first fan 62*a* is of metal and the second fan 62*b* of plastics material, so that in FIG. 12 the heads of the rivets 79*b* formed by moulding with the second fan are hot-reformed. In that case, the rivets 79*b*, instead of being hollow as in FIGS. 11 and 12, are solid and a third thermal insulating mechanism is preferably interposed, at least to a major extent, between the radial plate portion of the fan 62*b* and the rotor.

The first, second and third thermal insulating mechanisms consist for example of a layer or coating which is a thermal insulator, for example a material having the same properties as asbestos. All combinations are possible, whatever the nature (i.e. metal or plastics) of the fan. These combinations are equally applicable to the other embodiments.

For example, the second fan may be formed on one of its faces with a first thermally insulating coating for cooperation with the rotor, and on the other of its face, at the level of the branches 78*b*, with a coating for cooperation with the branches 78*a*. In a modified version, the second fan is formed with three thermal insulation mechanisms.

All of these techniques may be combined for forming all of the fastening points of the ventilating device that comprises a plurality of fans superimposed on each other.

The invention is not limited to the example which has just been described.

It is for example possible to arrange a single fastening point for each overlap zone, or, again, more than two points. For example, the whole of the zone Z is, in one embodiment, at least partly an adhesive bonding zone. In a modified version, the fastening points may be joined together by forming a fastening band which is for example obtained by adhesive bonding or transparent welding, which may also be called through welding, of the laser type. It is the invention that makes this possible.

It is not obligatory for all the superimposed portions defining an overlap zone to have fastening points. At least one branch, for example a second branch, may be without any blade. Thus, in one embodiment, a branch that has no blade has a portion for overlapping with an overlapping portion of a branch which may or may not have a blade.

As can be seen in particular in FIG. 2, one of the fans, 62*a*, or in another version both of the fans, may include an axially projecting, central, stiffening collar portion 84*a*. This collar portion 84*a*, in a modified version, is extended axially in length to form a sleeve which enables an annular magnetic target, which is used in the case of an alternator-starter as can be seen in FIG. 12 of the document WO01/69762, to which reference should be made for more detail, to be fitted, for example by force fitting.

This collar portion 84*a* stiffens the first fan 62*a* even more, which is thus, in one embodiment, thicker than the fan 62*b*. The collar portion may participate in the relative centering of the two fans, especially where it is the second fan 62*b* that has this collar portion. In that case, the inner periphery of the first fan is in intimate contact with the outer periphery of the collar portion.

The invention is not limited to the fastening of two superimposed fans together in order to achieve a ventilating device, for the number of fans can be higher, according to the complexity of the device, and especially according to the number and configuration of the blades.

Figure 5:
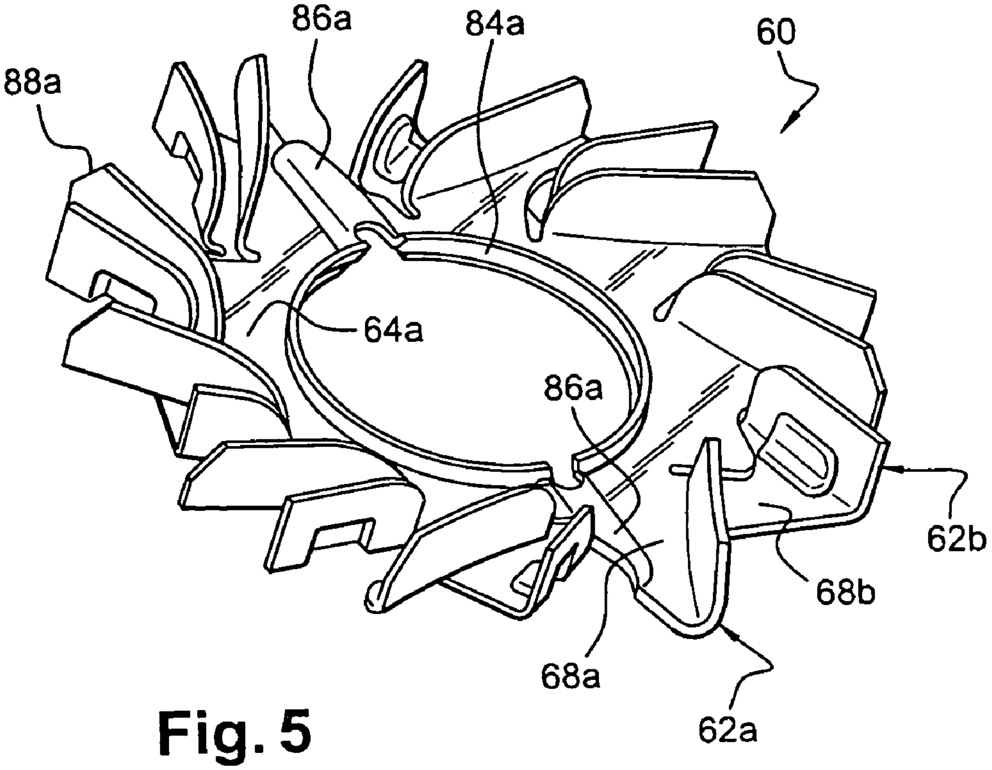
FIG. 5 is a perspective view, seen from the front, of one example of the application of the principles of the invention in the manufacture of a front ventilating device of the kind seen in FIG. 1.
Figure 6:
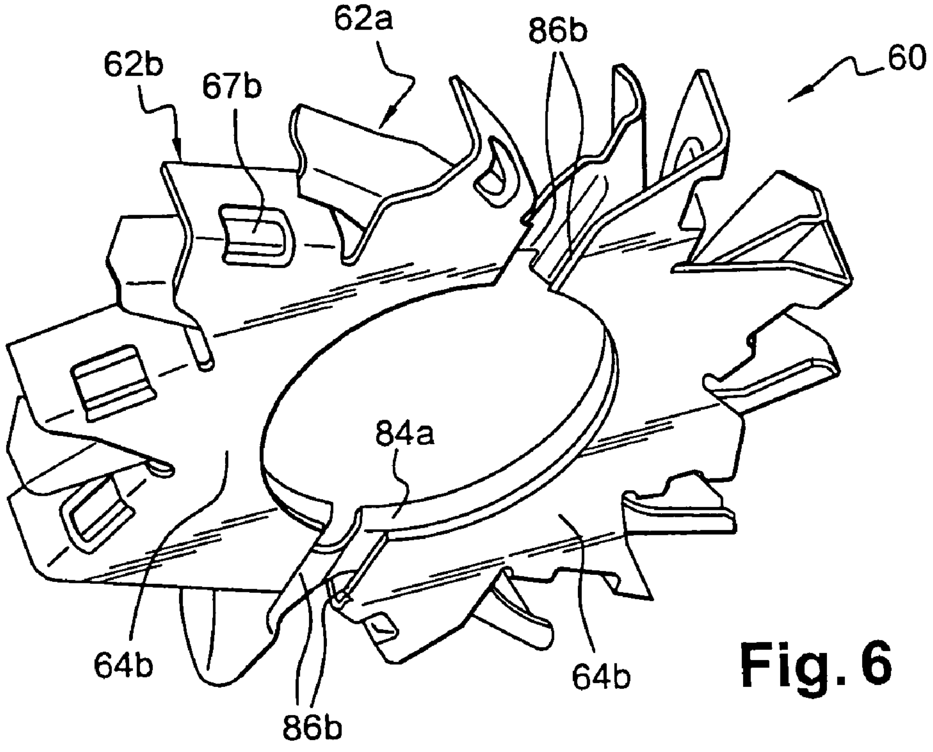
FIG. 6 is a perspective view, seen from the rear, of the front ventilating device of FIG. 5.
Figure 7:
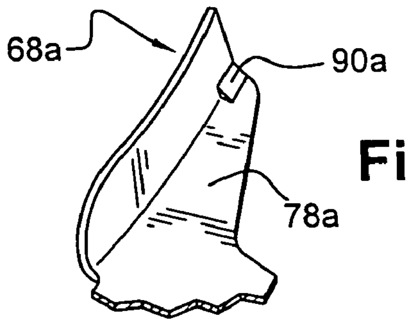
FIG. 7 is a scrap view on a larger scale, showing a modified version of one blade of the ventilating device of FIG. 5.

FIGS. 5 to 7 show a further example of a design of a rear ventilating device, which is intended to replace the rear device 42 shown in FIG. 1, which is fixed on the front transverse face 44 of the front pole wheel 20.

Identical references are used to designate those elements which are identical or similar to those described with reference to FIGS. 2 to 4.

FIG. 5 shows a rear ventilating device according to the invention which is designed for this purpose. It carries the general reference 60 and is mounted, in the embodiment described, in place of the rear fan 42 of FIG. 1, with the rear of the device 60 being in direct or indirect contact with the transverse face 46 of the rear pole wheel 21.

The ventilating device 60 in this example again consists of two adjacent fans 62*a* and 62*b*, referred to hereinafter as the first fan and second fan respectively.

The second fan 62*b* is arranged to be fixed, for example in a known way by spot welding or riveting, on the front face 44 of the appropriate axial end of the rear pole wheel 21 of the rotor shown in FIG. 1.

The second fan 62*b* is therefore in contact with the pole wheel concerned. This contact is direct or indirect contact, with the third thermal insulating mechanism, such as a coating or layer of electrical insulating material, being interposed at least locally between the pole wheel 21 concerned and the second fan 62*b*.

By comparison with the preceding embodiment, it will be seen that one of the two fans, which in this case is the first fan 62*a*, can include ribs or grooves 86*a* oriented radially for the passage of connecting wires for connecting the ends of the excitation windings 22 to the slip rings of the collector 18, these ribs 86*a* also participating in the stiffening of the first fan 62*a*.

The second fan 62*b* is made in two parts, substantially in two halves, so as to delimit two slots 86*b* which are arranged in facing relationship with the open faces of the grooves 86*a*.

However, because of the presence of a very large number of points of mutual fastening (not shown) between the overlapping portions of the blades of the two fans in accordance with the features of the invention, it is possible to fasten each half of the second fan 62*b* to the first fan 62*a* both rigidly and reliably.

According to the size of the ventilating device, it is of course possible for the second fan to be made in more than two parts, for example three parts.

In a further embodiment, the second fan 62*b* is thinner than the first fan 62*a*.

Each of the first blades 68*a* has a terminal chamfer 88*a*, which improves the mechanical resistance to centrifugal force.

As is shown in FIG. 7, in a further version it is possible to stiffen a blade 68*a* with a press-formed angle portion or buttress element 90*a* formed at the radial end of the blade at the level of the junction bend between its axially oriented curved main working portion and its branch 78*a*.

All of these arrangements (i.e. the terminal chamfer, the buttress element) may be transposed to the embodiment shown in FIGS. 2 to 4.

Figure 8:
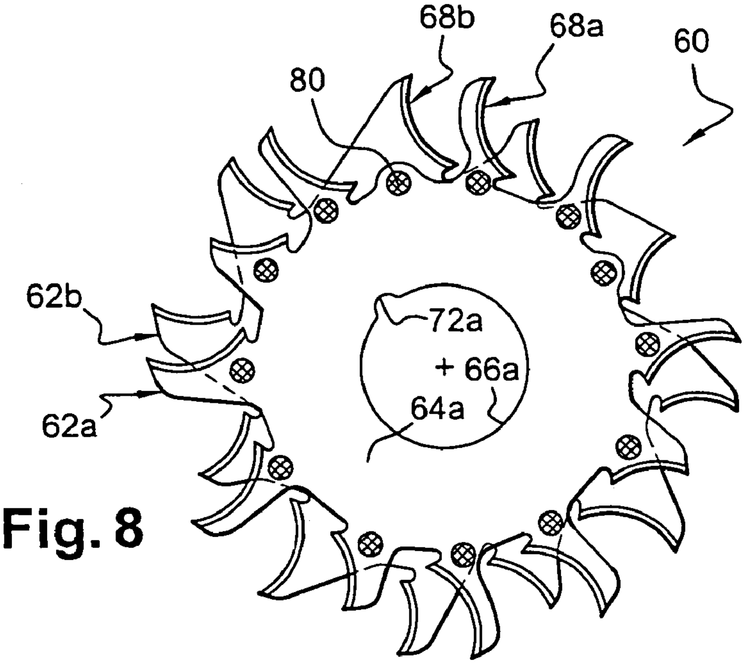
FIG. 8 is an axial end view, seen from the front, of another configuration of a ventilating device according to the invention.

FIG. 8 shows a modified embodiment of a front ventilating device 60 according to the invention, with irregular blades, which has only one set of mutual fastening points 80 arranged in a circle and spaced apart at substantially regular intervals. The device 80 is adapted to be fitted in place of the front ventilating device 42 shown in FIG. 1.

As can be seen in FIG. 8, the central annular plate portions are almost entirely available for use, in particular with a view to forming in them the points for fastening the ventilating device 60 on the front pole wheel 20 of the rotor.

All combinations of ventilating devices are possible for cooling a rotary electrical machine, which may also have no more than one ventilating device at one of the axial ends of its rotor.

Moreover, the field of the invention includes all combinations of forms, numbers and locations of blades.

In a modified version, it is also possible to arrange at least one fastening point 76 at the level of the annular plate portions 64*a* and 64*b*.

Without departing from the scope of the invention, it is also possible to arrange portions of blades in overlapping relationship with each other which are not necessarily portions of the transversely oriented roots of the blades, but may for example be axially oriented portions which are arranged for this purpose or which are part of the curved working portions of the blades.

One example of a fastening point 76 of a ventilating device according to the invention, for fastening the device on the rotor, will now be described given that, in general terms, one of the fans 62*a* and 62*b* is so configured that it has fastening points 76 adapted to be fixed on the rotor of the rotary electrical machine, and given that, preferably, these fastening points 76 are larger in size than the fastening points 80 and 82 by which the two fans 62*a* and 62*b* are fastened together as described earlier herein.

Figure 9:
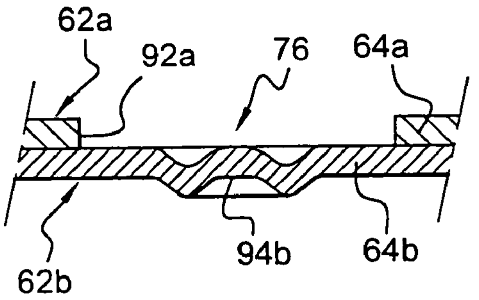
FIGS. 9 to 15 are scrap views, in cross section and on an enlarged scale, which illustrate fastening means used within the scope of the invention.

The first example, shown in FIG. 9, corresponds to a first fan 62*a* of plastics material or metal, and a second fan 62*b* of metal.

In order to permit a welding point 76 of the metallic central radial plate portion 62*b* to be formed on a transverse axial end face of the rotor, a hole or opening 92*a* is formed in the first radial plate portion 64*a*, of plastics material or metal.

In order to give a weld of good mechanical strength, the second radial plate portion has, in the known way, a press-formed dimple 94*b*, such that the welding point 76, for welding it on the rotor, is of the standard type. It will be appreciated that the hole 92*a* in the radial plate portion 64*a* is of large size by virtue of the invention.

Figure 10:
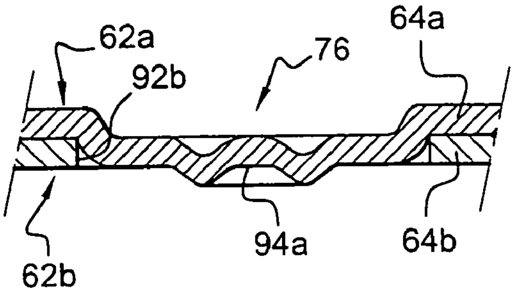

FIG. 10 shows an arrangement which is an inversion of that shown in FIG. 9, with the second radial plate portion 64*b* of plastics material or metal and the first radial plate portion 64*a* of metal. It will be appreciated that the second plate portion is laid closely on the rotor, because it is sandwiched between the appropriate face of the rotor in FIG. 1 and the first plate portion 64*a*.

The hole 92*b* in the plate portion 64*b* is again of large size by virtue of the invention, which enables the plate portion 64*a* to be press-formed locally in such a way that it can penetrate into the hole 92*b*. The plate portion 64*a* is then stepped locally so that the welding point 76 is of the standard type.

Figure 13:
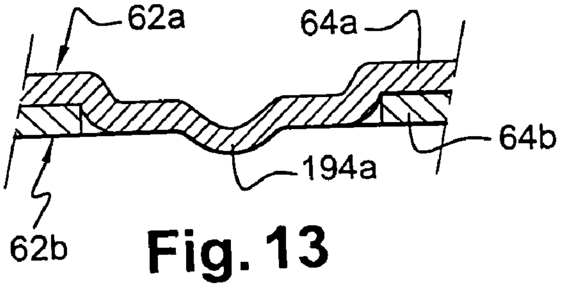

In another modified version, the welding point is of course made by press-forming in the appropriate radial plate portion, in the opposite direction from that in FIGS. 9 and 10. FIG. 13, which is analogous to FIG. 10, shows such an arrangement, in which the inverted press-formed element carries the reference 194*a*, the dorsal face of this element defining a trapezoidal depression.

Figure 14:
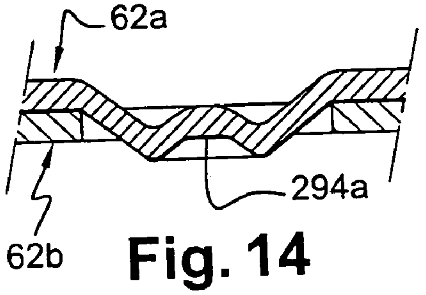
Figure 15:
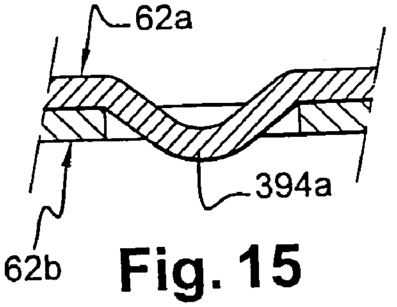

In yet another modification, the press-formed element is deeper, as can be seen at 294*a* and 394*a* in FIGS. 14 and 15, which are analogous to FIG. 10, the press-formed element 394*a* being of a similar form to the press-formed element 194*a*, while the press-formed element 294*a* is similar to the press-formed element 94*a*.

The ventilating device according to the invention can of course be mounted in a reversible alternator, of the kind called an alternator-starter, which is able to function also in an electric motor mode, in particular for starting the heat engine of the motor vehicle, as described in the document WO01/69762.

In another modified version, the ventilating device may be fitted in an alternator having a salient pole or permanent magnet rotor, as described in the document WO02/054566.

In that document, the rotor comprises a stack of laminations which are press-formed with openings to constitute housings which are adapted to receive permanent magnets, and which define arms around which excitation windings are wound. The housings for the magnets are formed by magnetic retaining pieces which have openings for receiving the excitation windings. These pieces extend on either side of the stack of laminations, and are fixed to this stack, for example by means of stretchers which extend both through the pieces and through the stacks of laminations.

It is on the said pieces that the ventilating device is fixed. For example these retaining pieces are formed with bosses which are threaded locally for the screw fastening of the ventilating device on them, as in the embodiments shown in FIGS. 15 and 16 of the said document WO02/054566.

The alternator may also be water cooled and be equipped with axial fans.

The windings of the stator may include conductor elements in the form of bars, such as generally U-shaped hairpins with a cross section which is preferably rectangular, as described in the document FR-A-2 820 896.

The internal ventilating device according to the invention enables the heads of the hairpins to be effectively cooled, because it is able to have the desired form.

In another modified version, each stator winding includes a delta-wound winding and a star-wound winding, having different cross sections and being mounted in the same slots as described in the documents US-A-4,163,187 and FR-A-2 737 063.

The alternator may include only one ventilating device, at the rear, due to the power of the ventilating device according to the invention.

The ventilating device according to the invention enables blades of the same configuration, in particular identical, to be obtained, but with these blades being very close together and therefore very numerous, and/or blades of long or complicated forms, which are accordingly unable to be made by bending from a single fan.

Thus, in another version, at least one blade of at least one of the fans is provided with an overhanging vane which extends in a direction inclined or at right angles to the plane of the radial plate portion of the fan concerned, as is described and shown in FIGS. 11 to 13 of the document FR-A-2 811 156. In general terms, thanks to the invention, it is possible to obtain the same configurations in two sets of blades, the size of which is different from that in the document FR-A-2 811 156 mentioned above, and to do this in a simple and inexpensive way. For example, at least one blade, and preferably at least some of the blades of at least one of the fans, may be corrugated, or have a decreasing axial height, or be flat and inclined with respect to a radial direction, as shown respectively in FIGS. 6, 15 and 2 of the said document.

The ventilating device enables at least one fan having at least one blade, and preferably having several blades, to be manufactured easily and inexpensively, the blades having a configuration which is such that the inlet angle defined on the inner pitch circle between the blade and the direction of the radius of that point on the circle is substantially the same as the outlet angle defined on the external pitch circle between the blade and the corresponding radius, as is described in Application No. FR01 14301 filed on Oct. 31, 2001, in which the said angle may be identical to the input and output angles for all the points between the input and the output. With this arrangement, turbulent flow of the cooling fluid, which is air in the present case, is minimised, while a large number of blades are provided.

In another version, it is possible to configure at least some of the blades of at least one of the fans in such a way that the angle of incidence of the blades at the level of the leading edge is in the range between 150° and 175°, while the angle of incidence of the blades at the level of the trailing edge is in the range between 90° and 165°, with respect to the tangent to a circle described during rotation of the blades, and the ratio between the mean pitch of the blades and the mean length of the latter is less than 0.975, as is described in Application No. FR01 05772 filed on 27 Apr. 2001. With this arrangement, friction losses are reduced in the cooling fluid.

In yet another modified version, at least one blade in at least one of the fans has perforations such as holes or slots for passage of the coolant fluid, air in this case, through them from one face to the other of that blade, whereby to compensate for the deceleration of the stream of fluid and thereby avoid detachment of the fluid and to reduce noise.

At least one blade in at least one of the fans extends, in a further version, in a direction which is inclined with respect to the plane at right angles to the radial plate portion of the fan concerned.

In the embodiments described, the blades of the fans extend in the same axial direction.

In another version, at least one fan has at least one blade which is directed in the opposite angular direction to the other blades, in such a way that that fan has at least two blades which lie on either side of its radial plate portion. In one embodiment, these blades extend into the space which is present between the teeth of the pole wheels 20 and 21 of the rotor 10.

At least one of the fans, in one embodiment, is made by moulding it in a plastics material on an insert, which is preferably of metal, in such a way that the blades may be at least partially of plastics material. For example, the insert extends wholly or almost wholly over the full extent of the radial plate portion of the fan, or at least over two-thirds of the moulded portion of the fan, as described in the document FR-A-2 830 293, to which reference should be made for more detail.

In that case, the blade is at least partly applied on its associated branch.

Figure 16:
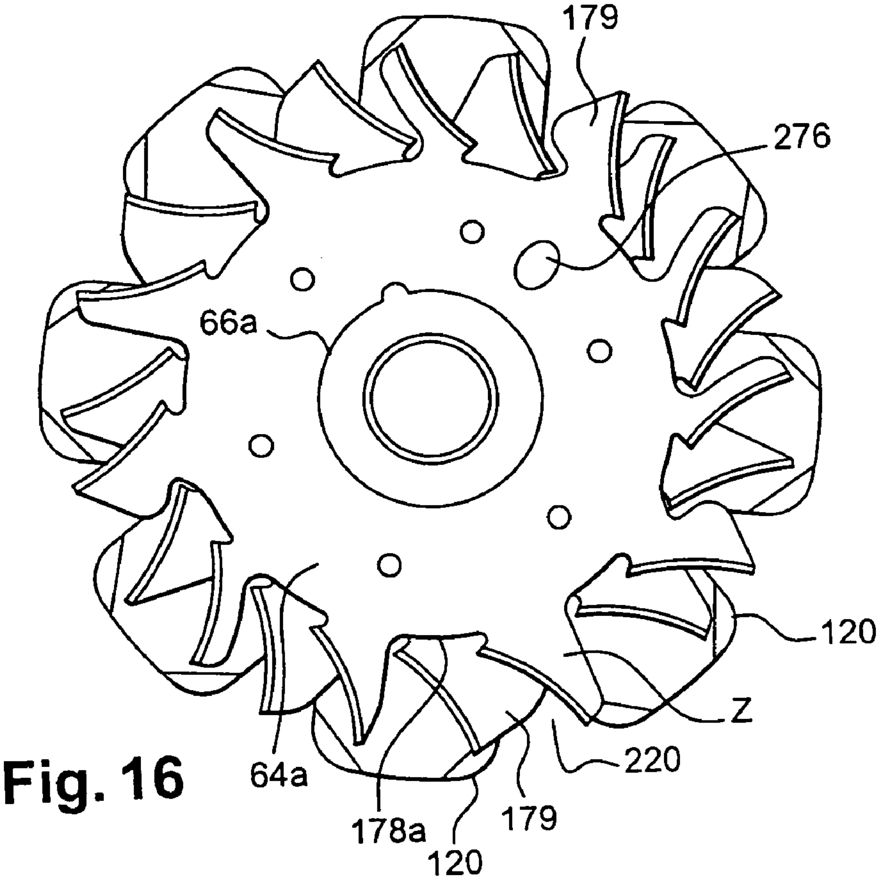
FIG. 16 is a view similar to FIG. 8, but showing the pole wheel on which the ventilating device is mounted.

It will be appreciated that, because of the overlap zones Z according to the invention and in order to reduce noise, it is possible to block up at least part of the space that exists between the teeth of the adjacent pole wheel, as can be seen in FIG. 16. In this Figure, the teeth of the front pole wheel 20 are shown at 120, and the spaces between the teeth 120 are shown at 220, the fan being of the same type as that in FIG. 8. It will be seen that the overlap zones Z lie in facing relationship with the spaces 220 so as to block the latter, partially in this example.

It will be appreciated that cut-outs **178*a* between two consecutive branches 78*a* are not identical, as can be seen in FIG. 16. This arrangement enables the fans to be balanced in advance (in a pre-balancing operation), by adding material to, or removing it from, some places. Thus, the cut-outs 178*a* define a balancing mechanism of the ventilating device 60**. This is made easier by the overlapping zones and the fastening points according to the invention, which enable the branches to be stiffened.

The same thing can of course be valid for the fan **62*b***.

In a modified arrangement, balancing is achieved by forming at least one through hole in at least one of the fans in the region of an overlapping zone of the branches, as can be seen at 176 in FIG. 3 and at 276 in FIG. 16, the through hole in the latter FIG. being formed in an appropriate branch of the fan **62*a* between two fastening points 80, 82. This at least one through hole (176 or 276) in at least one of the fans defines the balancing mechanism of the ventilating device 60**.

In a further version, material can be removed from at least the fan **62*a*, in the region of a fastening point of the branches, as can be seen at 177 in FIG. 3**.

The chamfers **88*a* do of course also enable balancing to be carried out and define the balancing mechanism of the ventilating device 60**. The same is true in forming apertures in the blades.

Dynamic balancing can be carried out in advance by adding material, as can be seen at 179 in FIG. 16.

Preferably, in order to reduce noise and avoid the occurrence of vibration, the first fan **62*a* is mounted on the rotor with pre-stressing, as described for example in the document FR-A-2 743 951, the faces 44 and/or 46 of the pole wheels 20 and 21 being of frusto-conical form, and fastening on the rotor being obtained by riveting or seaming. It is of course also possible to make use of the arrangements described in the document FR-A-2 603 142 for mounting the first radial plate portion 64*a*** on the rotor of the machine with a pre-stress, for which purpose the plate portion then has a convex form in the free state.

In that case, the two fans are fixed on the rotor with the aid of a sleeve which is force-fitted on ribs formed on the shaft of the rotor 14. In a modification, the shaft is screw threaded and the sleeve is a nut. Preferably, the threads of the rotor shaft are oriented in the opposite direction from the direction of rotation of the machine.

In a further modification, the fan 62*a* includes, as in FIG. 2, a collar portion force-fitted on ribs on the rotor shaft.

In yet another modification, the sleeve is fretted on the rotor shaft.

The invention claimed is:

1. A ventilating device (60) adapted to be fixed on a transverse end face (44, 46) of an axial end of a rotor of a rotary electrical machine, of the type comprising:

- a first fan (62*a*) comprising a first central plate portion (64*a*), from which first blades (68*a*) extend radially outwardly;
- at least one second fan (62*b*) comprising a second central plate portion (64*b*), from which second blades (68*b*) extend radially outwardly; and
- a fan fastening mechanism for fastening the two fans (62*a*, 62*b*),
- wherein each fan (62*a*, 62*b*) has, extending radially outwards from its outer periphery, first branches (78*a*) and second branches (78*b*) respectively, and wherein at least some of the said branches carry a blade, and
- wherein the first fan 62*a* has first branches (78*a*) extending radially outwardly from an outer periphery thereof and the second fan (62*b*) has second branches (78*b*) extending radially outwardly from an outer periphery thereof,
- wherein at least some of the first and second branches carry the first and second blades respecively, and
- wherein at least one first branch (78*a*) and at least one second branch (78*b*) include a first overlapping portion (78*a*) and a second overlapping portion (78*b*) superimposed on each other to define an overlap zone (Z), and in that the fan fastening mechanism (80, 82) of the two fans are arranged at least partly in the said overlap zone (Z).

2. The device according to claim 1, wherein the fan fastening mechanism includes at least one fan fastening point (80, 82) for fastening the overlapping portions (78*a*, 78*b*, Z) of the two branches (78*a*, 78*b*) together.

3. The device according to claim 2, wherein a balancing mechanism is located in the region of the fan fastening point (80, 82).

4. The device according to claim 1, wherein the fan fastening mechanism comprises at least two fan fastening points (80, 82) for fastening the overlapping portions (78*a*, 78*b*, Z) of the two branches together.

5. The device according to claim 4, wherein the two fan fastening points (80, 82) are arranged in the vicinity of the opposed ends of the two overlapping portions of the two branches.

6. The device according to claim 4, wherein the two fan fastening points (80, 82) are offset circumferentially and radially from each other.

7. The device according to claim 4, wherein one of the fans (62*a*, 62*b*) has rotor fastening points (76) which are adapted to be fixed on the rotor of the rotary electrical machine, and wherein the rotor fastening points (76) are of greater size than the fan fastening points (80, 82) fastening the two fans (62*a*, 62*b*) together.

8. The device according to claim 1, wherein the first and second overlapping portions of the branches (78*a*, 78*b*) are flat portions which lie in parallel planes.

9. The device according to claim 8, wherein each of the flat overlapping portions of the branches (78*a*, 78*b*) lies in the same plane as the central plate portion (64*a*, 64*b*) from which the corresponding blade (68*a*, 68*b*) extends.

10. The device according to claim 1, wherein one (62*b*) of the fans (62*a*, 62*b*) consists of a plurality of members fixed on the other fan (62*a*) by the fan fastening mechanism (80, 82).

11. The device according to claim 1, wherein at least one of the blades of one of the fans is carried by the branch having the overlapping portion which overlaps the overlapping portion of the branch that carries the blade of the other fan, and in that the fan fastening mechanism (80, 82) is arranged at least partly in the region of all of the overlapping portions of the branches.

12. The device according to claim 1, wherein a circumferential indexing mechanism (72*a*, 74*a*, 72*b*, 74*b*) is interposed between the first and second radial plate portions (64*a*, 64*b*), for circumferentially positioning the first blades with respect to the second blades, and in that the first and second radial plate portions (64*a*, 64*b*) are superimposed on each other.

13. The device according to claim 1, wherein a thermal insulating mechanism is interposed between the first overlapping portion (78*a*) and the second overlapping portion (78*b*).

* * * * *